United States Patent Office 3,509,169
Patented Apr. 28, 1970

3,509,169
$\Delta^2$-1,3,4-OXADIAZOLINE-4-CARBONITRILES AND THE PREPARATION THEREOF
Frank Dennis Marsh, Wilmington, Del., assignor to E. I. du Pont de Nemours and Company, Wilmington, Del., a corporation of Delaware
No Drawing. Filed June 5, 1967, Ser. No. 643,350
Int. Cl. C07d 85/54
U.S. Cl. 260—307
10 Claims

ABSTRACT OF THE DISCLOSURE $\Delta^2$ - 1,3,4 - oxadiazoline - 4 - carbonitriles having selected fluorinated substituents in the 5 positions formed by the reaction of a mixture of a fluoro-aliphatic ketone, cyanogen azide and an aliphatic nitrile or cyanogen halide at a temperature of 25–125° C. are claimed. These compounds are useful as soil fungicides.

BACKGROUND OF THE INVENTION

Field of the invention

This invention relates to fluorine-containing carbonitrile heterocyclic compounds and to the process for their preparation.

Description of the prior art

Heterocyclic compounds have long been known to have valuable biological activity making many of them useful for a variety of physiological and biological applications. The incorporation of fluorine into organic compounds has been shown to impart valuable properties into the fluoroorganic compounds and in some cases, the compounds have vastly different solubility and stability properties.

It is desirable to incorporate fluorine into heterocyclic compounds since improved and, in some cases, totally new biologically active compounds result.

Some $\Delta^2$-oxadiazoline compounds are known in the chemical literature. For example, Huisgen et. al., J. Org. Chem., 24, 892 (1959) (cf. also Proc. Chem. Soc., 357 (1961)) reports that 2,4,5-triphenyl-$\Delta^2$-1,3,4-oxadiazoline was formed by the thermolysis of 2,5-diphenyltetrazole in the presence of benzaldehyde. Several 4-acetyl-2,5-substituted $\Delta^2$-1,3,4-oxadiazolines were reported to be formed by the reaction of acetic anhydride with an acyl hydrazone.

These references do not describe or disclose fluorine-containing cyano-$\Delta^2$-1,3,4-oxadiazolines or the process for the preparation thereof.

SUMMARY OF THE INVENTION

This invention is directed to a compound of the formula $$X-(CF_2)_m\diagdown \atop X-(CF_2)_n\diagup \!\!\!\! \begin{array}{c} C-O \\ | \quad | \\ N \quad C-R \\ \diagdown \!\!\! \diagup \\ NC \quad N \end{array} \quad (I)$$

wherein R is halogen, lower alkyl or lower haloalkyl where the halogen is fluorine, chlorine, bromine or iodine; the X's singly, can be the same or different and are hydrogen, chlorine or fluorine; the X's, taken together, are —CF$_2$—; and n and m are integers of 1–6, inclusive; and when the X's are taken together, the sum of m and n is an integer of 2–4, inclusive.

The N-cyano-$\Delta^2$-1,3,4-oxadiazolines of this invention are produced by heating at a temperature of about 25–125° C. a mixture consisting of a ffuoroalkyl ketone, cyanogen azide and a nitrile selected from an alkyl, or haloalkyl nitrile or a cyanogen halide. These compounds are useful as soil fungicides.

DESCRIPTION OF THE PREFERRED EMBODIMENTS

This invention is directed to the 5,5-bis(fluoroalkyl)-substituted 4-cyano-$\Delta^2$-1,3,4-oxadiazolines.

The fluoroalkyl substituents of the compounds of this invention contain up to 6 carbon atoms such as: difluoromethyl, $\omega$-hydroperfluoroethyl, i.e., 1,1,2,2-tetrafluoroethyl, $\omega$-hydroperfluoropropyl, $\omega$-hydroperfluorobutyl, $\omega$-hydroperfluoropentyl, $\omega$-hydroperfluorohexyl, trifluoromethyl, chlorodifluoromethyl, $\omega$-chloroperfluoroethyl, pentafluoroethyl, $\omega$-chloroperfluoropropyl, heptafluoropropyl, $\omega$-chloroperfluorobutyl, nonafluorobutyl, $\omega$-chloroperfluoropentyl, undecafluoropentyl, $\omega$-chloroperfluorohexyl and tridecafluorohexyl. The compounds containing fluoroalkyl groups of up to 4 carbons are preferred.

The substituents in the 5 positions of the compounds of this invention can be perfluoroalkylidene groups. Perfluoroalkylene substituents such as: hexafluoropropylidene (—CH$_2$—CF$_2$CF$_2$—), octafluorobutylidene $$(-CF_2CF_2CF_2CF_2-)$$

and decafluoropentylident (—CF$_2$CF$_2$CF$_2$CF$_2$CF$_2$—), are included within the scope of the invention with perfluoroalkylidene substituents containing 4 and 5 carbons being preferred.

The term R in Formula I can be lower alkyl, lower haloalkyl or halogen and can contain up to 6 carbons such as: methyl, ethyl, n-propyl, isopropyl, n-butyl, 2-butyl, pentyl, hexyl, dichloromethyl, dibromomethyl, diiodomethyl, 2-chloroethyl, 2-bromoethyl, 3-bromo-n-propyl, $\omega$-iodopentyl, $\omega$-chlorohexyl and the like. The halogen of the haloalkyl group is fluorine, chlorine, bromine or iodine. Compounds with R having up to 4 carbons and chlorine are preferred. R can also be halogen such as: fluorine, chlorine, bromine or iodine.

The process of this invention can be described by the equation $$N_3CN + X-(CF_2)_n-\overset{O}{\overset{\|}{C}}-(CF_2)_m-X + RCN \longrightarrow I$$

II       III              IV wherein R, X, m and n are as defined above. The process comprises heating at a temperature of 25–125° C., and preferably at a temperature of 40–75° C., a mixture of cyanogen azide (II), a fluoroketone (III) and a nitrile (IV). The reaction can be conducted in a batch or flow system usually at atmospheric pressures. The process can be conducted at either reduced or superatmospheric pressure.

It is convenient to conduct the process in the presence of excess nitrile or fluoroketone reactant or in the presence of nonreactive solvents or diluents such as an ester such as ethyl acetate or a halocarbon such as methylene chloride or chloroform. An excess of up to 100-fold of any reactant can be used, but an excess of the ketone and/or nitrile reactant is desirable for best results. The process can be operated without solvent or excess reactant.

The time of reaction, in general, depends upon the reaction temperature. Lower temperatures and longer times are generally used in batch systems, and higher temperature and shorter times are used in flow systems. Batch process times are usually in the range of 0.5 to 24 hours and flow process contact times are generally in the range of 0.05 to 120 seconds.

The nitrile reactant in the process can be a cyanogen halide (see Example 5) which can be added separately or can be present as a component of the cyanogen azide reagent, especially if an excess of the cyanogen halide has been used as precursor to cyanogen azide in preparing the latter. Occasionally a residual amount of cyanogen halide (normally removed) may be inadvertently present in the cyanogen azide reagent. If an organic nitrile is added to a mixture containing cyanogen azide, a ketone and residual cyanogen halide, the cyanogen halide will generally react preferentially. In this event, the organic nitrile will react secondarily or may serve merely as a less reactive medium.

The reactants used in the process are readily available or can be easily prepared. For example, the fluoroketones III are well-known materials which have been described in Lovelace, Rausch and Pastelnek, "Aliphatic Fluorine Compounds," Reinhold Publishing Corporation, New York, 1958, pp. 190–192.

Cyanogen azide, described and claimed in my U.S. Pat. 3,410,658, is explosive when free of solvent and should be handled with care. Alkyl nitriles, haloalkyl nitriles and cyanogen halides used in the process are well-known compounds.

The following examples further illustrate the invention. In the examples, temperature is in degrees centigrade and pressure is in mm. of mercury unless otherwise expressed.

EXAMPLE 1

5,5-bis(difluorochloromethyl)-2-methyl-$\Delta^2$-1,3,4-oxadiazoline-4-carbonitrile

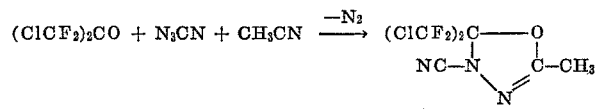

Cyanogen azide (3.4 g., 0.05 mole) in acetonitrile (total solution volume, 14.2 ml.) was added to 1,3-dichlorotetrafluoroacetone, and the mixture was stirred and heated at 48–52° C. for 21.5 hours during which time nitrogen (ca. 0.04 mole) was liberated. Volatile materials were removed on a rotary evaporator (0.3 mm./35° C.) to give a brown oil (9.50 g., 68%). The oil was distilled in a short path still at 0.35μ (pot temp. 61–100° C.) to give a straw colored oil (4.42 g.) of 5,5-bis(difluorochloromethyl) - 2 - methyl-$\Delta^2$-1,3,4 - oxadiazoline-4-carbonitrile.

Analysis.—Calcd. for $C_6H_3N_3F_4Cl_2O$ (percent): C, 25.74; H, 1.08; N, 15.01; F, 27.14; Cl, 25.33. Found (percent): C, 25.64; H, 1.08; N, 14.51; F, 26.78; Cl, 25.77, 26.77.

The H n.m.r. spectrum (undiluted sample) showed a single absorption peak ($\tau$7.79); and the $F^{19}$ n.m.r. spectrum showed a single fluorine resonance at −220 cps. (from symtetrachlorodifluoroethane as external standard, 56.1 mc.).

Infrared absorption occurred at 3.41μ (saturated C–H), 4.47μ (C≡N), and 4.94μ (C=N).

In a similar preparation the crude product, obtained in 76% yield, was fractionated in a spinning-band column to give a colorless oil (B.P. 38–40° C./0.5 mm.; $n_D^{25}$ 1.4170). This fraction was shown by gas chromatography to be better than 99% pure.

Mass spectroscopic analysis of the product gave a fragment ion of $CH_3CO^+$ (43 m/e); parent ion, 279; isotopes 280–283. Calcd. M.W. is 280.

EXAMPLE 2

5,5-bis(trifluoromethyl)-2-methyl-$\Delta^2$-1,3,4-oxadiazoline-4-carbonitrile

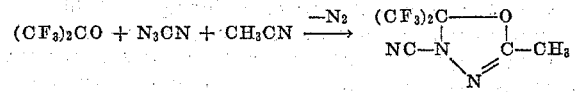

Cyanogen azide (0.09 mole) in acetonitrile (30 ml., total solution volume) was added to a hydrogen fluoride-resistant bomb under nitrogen. The bomb was closed, cooled, and evacuated; and hexafluoroacetone (28.5 g.) was added by gas transfer. The reaction mixture was agitated and heated at 50° C./60–100 p.s.i. for 8 hours, and at 60° C./130–190 p.s.i. for 7 hours more. The bomb was vented, and the liquid fraction removed. Liquid fractions from two identical runs were combined and the volatiles removed on a rotary evaporator (0.2 mm./30° C.). A brown oil (39 g., 87.5%) was obtained which was distilled in a short path still to give a colorless product (19.56 g., 44%). A portion from a collection of such products from several runs was fractionated through a 17" x 10 mm. spinning-band column to give a refined sample (B.P. 55–57° C./16 mm., $n_D^{25}$ 1.3526) of 5,5-bis (trifluoromethyl)-2-methyl-$\Delta^2$-1,3,4-oxadiazoline - 4 - carbonitrile. Vapor phase chromatography indicated this sample to be 93–98% pure, and preparative scale gas chromatography of a portion of it gave analytically pure material (B.P. 68° C./77 mm., $n_D^{23}$ 1.3550).

Analysis.—Calcd. for $C_6H_3F_6N_3O$ (percent): C, 29.16; H, 1.22; F, 46.13; N, 17.01; M.W., 247. Found (percent): C, 29.35; H, 1.61; F, 45.56, 46.77, 45.55; N, 17.31, 17.42; M.W., 247 (mass spec.)

The H n.m.r. spectrum (undiluted sample using tetramethylsilane as internal standard) showed a single proton resonance ($\tau$7.80); and the $F^{19}$ n.m.r. spectrum showed a single fluorine resonance at 709 cps. from s-tetrachlorodifluoroethane, (56.4 mc.).

The pure compound absorbed in the infrared region at 3.4μ (saturated C–H), 4.6μ (C≡N), 5.9μ (C=N), and in the 8μ region (C–F).

Mass spectroscopic analysis of the products gave a fragment ion of $CH_3CO^+$ (43 m/e).

EXAMPLE 3

5-(4H-octafluorobutyl)-5-(2H-tetrafluoroethyl)-2-methyl-$\Delta^2$-1,3,4-oxadiazoline-4-carbonitrile

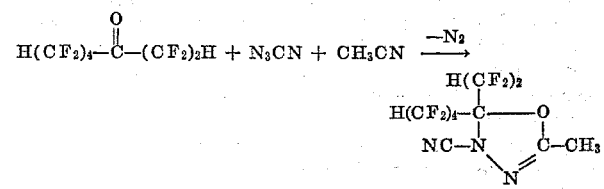

Cyanogen azide (10.2 g., 0.15 mole) in acetonitrile (62.5 cc. total solution volume was added to 1H,7H-dodecafluoro-3-heptanone (50 g., 0.15 mole), and the mixture was heated and stirred at 47–62° C. for 122 hours during which time nitrogen (ca 0.15 mole) was liberated. The reaction mixture was filtered, and the filtrate was evaporated to dryness on a rotary evaporator (1 mm., 30° C.) to give a viscous liquid residue (46.7 g.). The residue was slurried with methylene chloride (100 ml.) and filtered again. The methylene chloride filtrate was evaporated to dryness on a rotary evaporator to give a residual mobile light brown oil (28 g., 46%). This brown oil was distilled in a short path still to give 5-(4H-octafluorobutyl)-5-(2H-tetrafluoroethyl) 2-methyl-$\Delta^2$-1,3,4-oxadiazoline-4-carbonitrile as a colorless oil (20.8 g., 37%). An aliquot (18 g.) of the colorless oil was fractionated in a 6" Vigreux column to give a pure product, B.P. 76° C./3μ; $n_D^{25}$ 1.3680. The infrared spectra of the brown residual oil and the fractionated product were identical.

Analysis.—Calcd. for $C_{10}H_5F_{12}N_3O$ (percent): C, 29.21; H, 1.23; N, 10.22; F, 55.45; M.W., 411.2. Found (percent): C, 28.82, 29.13; H, 1.38, 1.37; N, 10.65, 10.63; F, 55.46; M.W., 411 (mass spec.).

Infrared spectrum: 3.33μ (saturated (C—H), 4.46μ (C≡N), 5.91μ (C=N), 8–9μ (C—F). H n.m.r. spectrum (undiluted sample, tetramethylsilane as internal standard).

| $\tau$ | Assignment | Intensity |
|---|---|---|
| 7.86 (single peak) | —$CH_3$ | 3 |
| 3.86 (triplet further split, J=52 cps.) | —$CF_2H$ | 2 |

EXAMPLE 4

5,5-bis(chlorodifluoromethyl)-2-(β-chloroethyl)-Δ²-1,3,4-oxadiazoline-4-carbonitrile

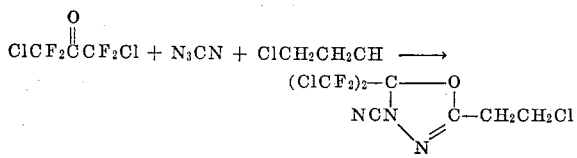

Cyanogen azide (13.6 g., 0.2 mole) dissolved in 1,3-dichlorotetrafluoroacetone (total volume 122 ml.) was added to β-chloropropionitrile (54 g., 0.6 mole), and the mixture was stirred and heated at 40–49° C. for 3 days during which time the nitrogen (~0.15 mole) was liberated. The reaction mixture was concentrated on a rotary evaporator (1 mm./25° C.) and the concentrate filtered. The filtrate was distilled in a molecular still to separate unreacted β-chloropropionitrile and essentially pure product (9.1 g.). The product was fractionated through a 6" Vigreux column to give analytically pure 5,5-bis(chlorodifluoromethyl)-2-(β-chloroethyl) - Δ² - 1,3,4-oxadiazoline-4-carbonitrile (B.P. 78° C./3μ; $n_D^{24.2}$ 1.4436.

*Analysis.*—Calcd. for $C_7H_4F_4N_3Cl_3O$ (percent): C, 25.59; H, 1.23; N, 12.79; F, 23.14; M.W., 328.5. Found (percent): C, 25.83, 25.88; H, 1.49, 1.37; N, 12.79, 12.94; F, 23.40; M.W., 328 (mass spec.).

Infrared spectrum: 3.38; (C—H), 4.45μ (C≡N), 5.95μ (C=N). H n.m.r. spectrum: (undiluted sample, tetramethylsilane as internal standard).

Two distorted triplets ($A_2X_2$ pattern) centered at τ 6.20 and 6.09.

$F^{19}$ n.m.r. spectrum: (neat sample, fluorotrichloromethane as external standard).

Single peak, 635 p.p.m., 56.4 mc. Mass spectrum: contained a 91 m./e. ion ($^{35}ClCH_2CH_2CO^+$).

EXAMPLE 5

5,5-bis(chlorodifluoromethyl)-2-chloro-Δ²-1,3,4-oxadiazoline-4-carbonitrile

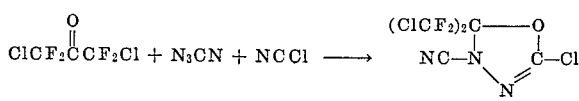

A solution of cyanogen azide (13.6 g., 0.2 mole) in 1,3-dichlorotetrafluoroacetone (total solution volume 127 ml.) containing cyanogen chloride was added to a 200 ml. hydrogen fluoride resistant bomb and evacuated to ~400 mm. pressure. Trifluoroacetonitrile (37 g., 0.44 mole) was added as a gas. The mixture was heated and agitated for 8 hours at 50–52° C. and then for 8.5 hours at 58–60° C. The bomb was cooled to room temperature and volatile materials were vented. The liquid fraction was filtered and the filtrate concentrated in a rotary evaporator (285 mm./25° C.) to give a brown mobile oil (18.25 g., 30%). This oil was distilled in a short path still at a pot temperature at 25–115° C. and a pressure of 100–102 mm. to give a colorless oil (7.35 g., 12%). Products from this and a similar run were combined, and an aliquot of the whole was purified by vapor phase chromatography [2' x ¾" O.D. column packed with 25% fluorosilicon (FS 1265) on firebrick; column temperature 125° C.; helium flow rate 300 ml./minute]. The product collected at 5.25 minutes (2.35 g.; B.P. 52° C./4 mm.; $n_D^{24.1}$ 1.4260) analyzed correctly for 5,5-bis(chlorodifluoromethyl)-2-chloro - Δ² - 1,3,4 - oxadiazoline - 4 - carbonitrile.

*Analysis.*—Calcd. for $C_5Cl_3F_4N_3O$ (percent): C, 19.99; Cl, 35.39; F, 25.29; N, 13.98; M.W., 300. Found (percent): C, 20.37, 20.17; Cl. 35.17; F, 25.22; N, 14.03 14.05; M.W., 299, 301 (mass spec.).

Infrared spectrum: 4.43μ (C≡N), 6.08μ (C=N), 8–9μ (CF and/or CO). $F^{19}$ n.m.r. spectrum: (undiluted sample, fluorotrichloromethane as external standard). Single peak, 3588 cps. 56.4 mc. Mass spectrum: contained a 65 m./c. ion ($^{35}ClCO^+$).

The N-cyanooxadiazolines of this invention are useful as soil fungicides. For example, the compounds which are produced in Examples 1 and 2 have been found to inhibit the growth of Rhizoctonia and Pythium.

Rhizoctonia spp. is a common soil fungi. The species *Rhizoctonia solani*, for example, attacks many valuable plants including: (1) Field crops such as alfalfa, cotton, peanuts, sugar beets, sugar cane, and soybeans; (2) Ornamentals and house plants such as aster, begonia, carnation and the like; (3) Cereals and grasses such as barley, bent grass, rye, oats, and wheat; and (4) Truck crops such as beans, beets, cucumbers, eggplant, lettuce, onions, potatoes, and tomatoes.

In general, plant protectant compositions containing compounds of this invention contain one or more surface active agents. Surfactants can be present in compositions in the range of 0.1 to 20 percent with 0.2–10% by weight preferred. Active surfactants useful in the plant protectant compositions are disclosed in U.S. Patents 2,412,510; 2,426,417 and 2,655,447. The compounds can be applied to the soil, before or after planting, or application can be made to growing plants. The rate of application will vary and will generally be in excess of the amount necessary to control the fungi. Generally, the compounds of this invention are applied to soils in amounts ranging from 0.05 pounds per acre or less to 20 pounds per acre. More can of course be used.

The following example illustrates the method of producing plants from plant fungi such as Rhizoctonia.

EXAMPLE A

The product of Example 1 was dissolved in acetone and applied at a rate equivalent to 1 pound per acre to soil inoculated with *Rhizoctonia solani*. Compounds of Example 1 gave about 100% control, based on the germination of the seeds.

The procedure of Example A was repeated using the product of Example 2 with soil inoculated with Pythium. About 100% control was achieved.

The cyano compounds of this invention are hydrolyzed in excellent yield to the corresponding new amides by treatment of the cyano compounds with concentrated hydrochloric acid at room temperature or with hydrogen peroxide at lower temperatures. For example, when the product of Example 1 was hydrolyzed, there was obtained 5,5 - bis(difluorochloromethyl)-2-methyl-Δ²-1,3,4-oxadiazoline-4-carboxamide, M.P. 140–141.4° C. When the product of Example 2 was hydrolyzed there was obtained 5,5-bis(trifluoromethyl)-2-methyl-Δ²-1,3,4-oxadiazoline-4-carboxamide, M.P. 121.8–123.2° C.

The foregoing detailed description has been given for clarity of understanding only and no unnecessary limitations are to be understood therefrom.

The embodiments of the invention in which an exclusive property or privilege is claimed are defined as follows:

1. A compound of the formula

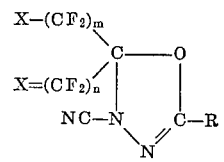

wherein
(a) R is halogen, lower alkyl or lower haloalkyl where the halogen is fluorine, chlorine, bromine or iodine;
(b) the X's, singly, can be the same or different and are hydrogen, chlorine or fluorine;
(c) the X's, taken together, are —$CF_2$—; and
(d) n and m are integers of 1–6, inclusive; and when the X's are taken together the sum of n and m is an integer of 2–4, inclusive.

2. The compound of claim 1 wherein the X's are Cl, $n$ and $m$ each is 1 and R is $CH_3$; said compound being 5,5-bis(difluorochloromethyl)-2-methyl-$\Delta^2$-1,3,4 - oxadiazoline-4-carbonitrile.

3. The compound of claim 1 wherein the X's are fluorine, $n$ and $m$ each is 1 and R is $CH_3$; said compound being 5,5-bis(trifluoromethyl - 2 - methyl-$\Delta^2$-1,3,4-oxadiazoline-4-carbonitrile.

4. The compound of claim 1 where the X's are hydrogen, $n$ and each $m$ is 4 and R is $CH_3$; said compound being 5-(4H-octafluorobutyl) - 5 - (2H-tetrafluoroethyl)-2-methyl-$\Delta^2$-1,3,4-oxadiazoline-4-carbonitrile.

5. The compound of claim 1 where the X's are chlorine, $n$ and $m$ each is 1 and R is $\beta$-chloroethyl; said compound being 5,5-bis(chlorodifluoromethyl - 2 - ($\beta$-chloroethyl-$\Delta^2$-1,3,4-oxadiazoline-4-carbonitrile.

6. The compound of claim 1 where the X's are chlorine, $n$ and $m$ each is 1 and R is chlorine; said compound being 5,5-bis(chlorodifluoromethyl)-2-chloro - $\Delta^2$ - 1,3,4-oxadiazoline-4-carbonitrile.

7. A process for preparing a compound of claim 1 comprising heating at a temperature of 25–125° C. a mixture of cyanogen azide, a fluoroketone of the formula $$X-(CF_2)_n-\overset{O}{\underset{\|}{C}}-(CF_2)_mX$$

and a nitrile of the formula RCN wherein X, R, $n$ and $m$ are as defined in claim 1.

8. The process of claim 7, wherein the reaction is conducted at 40–75° C.

9. The process of claim 7, comprising reacting a mixture of cyanogen azide, 1,3-dichlorotetrafluoroacetone and acetonitrile at a temperature of 25–125° C.

10. The process of claim 7, comprising reacting a mixture of cyanogen azide, hexafluoroacetone and acetonitrile at a temperature of 25–125° C.

References Cited

Wiley, Chemistry of Heterocyclic Compounds, vol. 17, (Interscience, New York, 1962), page 274.

ALTON D. ROLLINS, Primary Examiner

U.S. Cl. X.R.

424—272